United States Patent
Jung et al.

(10) Patent No.: US 6,177,971 B1
(45) Date of Patent: Jan. 23, 2001

(54) SLIM TYPE NOTEBOOK PERSONAL COMPUTER

(75) Inventors: Yu-Ho Jung, Kumi-shi; Jin-Kyu Kim, Suwon, both of (KR)

(73) Assignee: LG. Philips LCD Co., Ltd. (KR)

( * ) Notice: Under 35 U.S.C. 154(b), the term of this patent shall be extended for 0 days.

(21) Appl. No.: 09/210,354

(22) Filed: Dec. 11, 1998

(30) Foreign Application Priority Data

Apr. 22, 1998 (KR) .............................................. P98-14410

(51) Int. Cl.[7] .................................................. G02F 1/1333
(52) U.S. Cl. .................................................. 349/60; 349/58
(58) Field of Search ................................. 349/58, 60, 158

(56) References Cited

U.S. PATENT DOCUMENTS

| 4,878,738 | * | 11/1989 | Hanami | 350/334 |
| 5,182,660 | * | 1/1993 | Tanaka | 359/49 |
| 5,703,665 | * | 12/1997 | Muramatsu et al. | 349/60 |

FOREIGN PATENT DOCUMENTS

| 405313180 | * | 11/1993 | (JP) | 349/60 |
| 406027442 | * | 2/1994 | (JP) | 349/60 |
| 08179288 | * | 7/1996 | (JP) | 349/60 |

* cited by examiner

*Primary Examiner*—James A. Dudek
(74) *Attorney, Agent, or Firm*—Long, Aldridge & Norman

(57) ABSTRACT

A slim type notebook personal computer mounted with a liquid crystal display module in such a manner to have a thin thickness. In the computer, a top bezel is secured to the edge of a lower glass substrate included in the liquid crystal display module. A buffing member positioned between the edge of the lower glass substrate and the top bezel buffs an impact to be applied to the edge of the lower glass substrate.

29 Claims, 3 Drawing Sheets

SLIM TYPE NOTEBOOK PERSONAL COMPUTER

BACKGROUND OF THE INVENTION

1. Field of the Invention

This invention relates to a notebook personal computer, hereinafter referred to as "NTPC", having a flat panel display, such as a liquid crystal display module, and more particularly to an NTPC wherein a liquid crystal display module is mounted in such a manner to have a slim structure.

2. Description of the Related Art

Generally, a conventional NTPC is manufactured having a size that allows a user to exploit information in the course of his travels. In such an NTPC, a liquid crystal display (LCD) module is used as the display device for displaying the image and information. As shown in FIG. 1, the LCD module includes an upper glass substrate 2 and a lower glass substrate 4 that are positioned between an upper polarizing plate 6 and a lower polarizing plate 8. Liquid crystal cells are arranged between the upper glass substrate 2 and the lower glass substrate 4 in an active matrix pattern.

A thin film transistor for switching a video signal is provided at each liquid crystal cell. The refraction index of each liquid crystal cell is changed in accordance with the video signal to display a picture corresponding to the video signal. The upper and lower polarizing plates 6 and 8 is responsible for enlarging a viewing angle of a picture displayed by the liquid crystal cell matrix. Further, the LCD module includes prism sheets 12, a light guide 14 and a reflective sheet 16 that are overlapped between the lower polarizing plate 8 and a supporting frame 10. The light guide 14 has a lamp 14A installed at one side thereof. The light guide 14 guides light from the lamp 4A into the lower glass substrate 4. The prism sheets 12 allow a light received obliquely from the surface of the light guide 14 to be progressed toward the lower glass substrate 4 perpendicularly. In other words, the prism sheets 12 serve to set upright the progressing direction of the light from the surface of the light guide 14. The reflective sheet 16 reflects the light directed from the light guide 14 to the supporting frame 10 toward the light guide 14 again.

Furthermore, the LCD module includes a printed circuit board(PCB) 18 positioned under the reflective sheet 16 and between the supporting frames 10, and a flexible printed circuit(FPC) film 20 for coupling the PCB 18 with the liquid crystal cell matrix on the lower glass substrate 4. Drive integrated circuit chips 22 for driving the liquid crystal cell matrix are loaded on the FPC film 20. The drive integrated circuit chips 22 drive the liquid crystal matrix on the lower glass substrate 4 in accordance with a signal from the PCB 18.

The LCD module constructed in this manner is pivotally connected to a body of the NTPC and opened at an angle greater than 90° with respect to the surface of the NTPC body during its use. Also, the LCD module must be protected by means of a housing 24 so that it is not damaged from an exterior impact or hostile external condition. The housing 24 is formed to surround the bottom surface and the side surfaces of the LCD module as shown in FIG. 1. A top bezel 24A is provided at the upper end of the housing 24. The top bezel 24A is disposed along with a metal frame 26 at the edge of the upper polarizing plate 12 corresponding to the uppermost layer of the LCD module. Because the top bezel 24A and the metal frame 26 are disposed at the edge of the upper polarizing plate 6, the housing 18 surrounding the LCD module becomes thick and further the NTPC becomes thick.

SUMMARY OF THE INVENTION

Accordingly, it is an object of the present invention to provide a flat panel display module for used in such devices as a notebook size personal computer wherein the flat panel display module is mounted in such a manner to have a reduced thickness.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

In order to achieve this and other objects of the invention, a slim type notebook personal computer according to one aspect of the present invention includes a display module having an upper glass substrate overlapped with a lower glass substrate in such a manner to expose the edge of the lower glass substrate; a top bezel mounted to the edge of the lower glass substrate; and a buffing member provided between the edge of the lower glass substrate and the top bezel to buff an impact.

A slim type notebook personal computer according to another aspect of the present invention includes a display module having an upper glass substrate overlapped with a lower glass substrate in such a manner to expose the edge of the lower glass substrate; a metal frame secured to the edge of the lower glass substrate; a top bezel secured to the upper portion of the metal frame; and a buffing member provided between the edge of the lower glass substrate and the metal frame to buff an impact.

A slim type notebook personal computer according to still another aspect of the present invention includes a display module having an upper glass substrate overlapped with a lower glass substrate in such a manner to expose the edge of the lower glass substrate, and drive integrated circuits arranged at the edge of the lower glass substrate; a top bezel secured to the edge of the lower glass substrate; and buffing dummies arranged at the edge of the lower glass substrate to support the top bezel without contacting the drive integrated circuits.

These and other aspects, features and advantages of the present invention will be better understood by studying the detailed description in conjunction with the drawings and the accompanying claims.

BRIEF DESCRIPTION OF THE DRAWINGS

A detailed description of embodiments of the invention will be made with reference to the accompanying drawings, wherein like numerals designate corresponding parts in the several figures.

DETAILED DESCRIPTION OF THE PREFERRED EMBODIMENT

Figure 1:
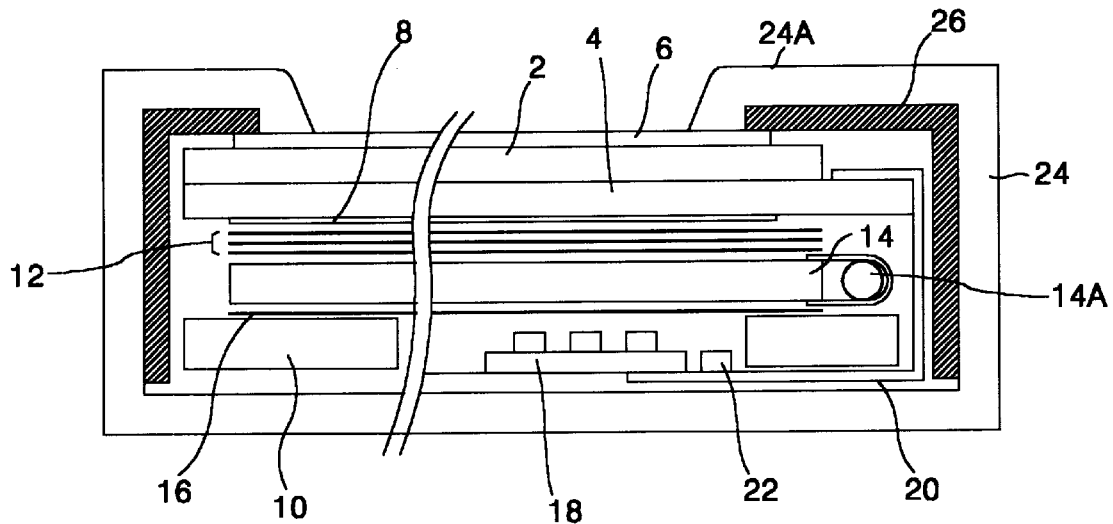
FIG. 1 is a sectional view showing the structure of the conventional notebook personal computer.
Figure 2:
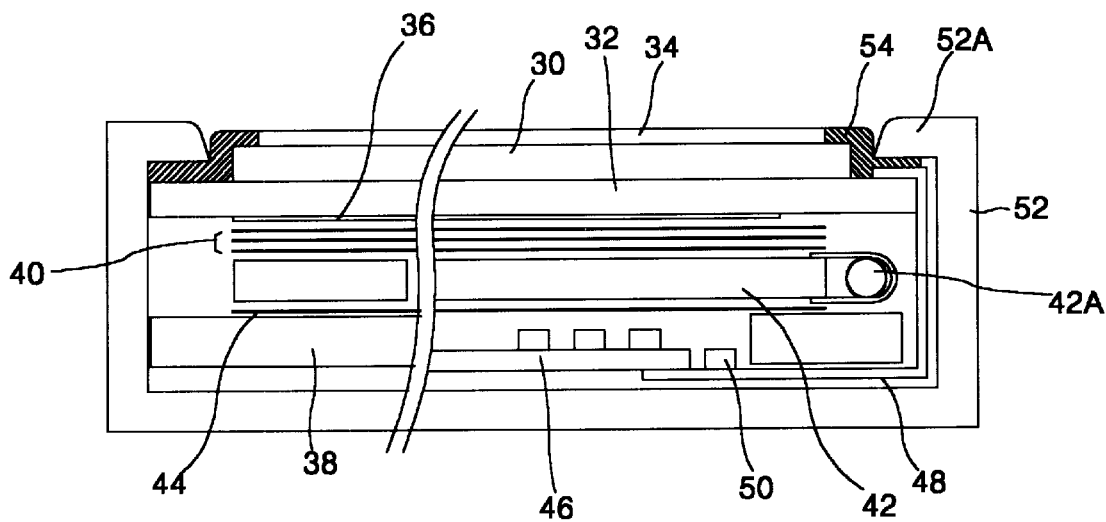
FIG. 2 is a sectional view showing the structure of a notebook personal computer according to a first embodiment of the present invention.

Referring to FIG. 2, there is shown a slim type NTPC having an LCD module according to a first embodiment of the present invention. The LCD module includes an upper glass substrate 30 and a lower glass substrate 32 that are positioned between an upper polarizing plate 34 and a lower polarizing plate 36. Preferably, liquid crystal cells are arranged in an active matrix pattern between the upper glass substrate 30 and the lower glass substrate 32. A thin film transistor for switching in response to a video signal is provided at each liquid crystal cell.

In the first embodiment of the present invention, the upper glass substrate 30 has a smaller dimension than the lower glass substrate 32 to preferably expose the edges of the lower glass substrate 32. The refraction index of each liquid crystal cell is changed in accordance with the video signal to display a picture corresponding to the video signal. The upper and lower polarizing plates 34 and 36 are responsible for enlarging a viewing angle of a picture displayed by the liquid crystal cell matrix. Further, the LCD module includes prism sheets 40, a light guide 42 and a reflective sheet 44 that are overlapped between the lower polarizing plate 36 and a supporting frame 30. The light guide 42 has a lamp 42A installed at one side thereof. The light guide 42 guides a light from the lamp 42A into the lower glass substrate 32. The prism sheets 40 allow a light received obliquely from the surface of the light guide 42 to be progressed toward the lower glass substrate 32 perpendicularly. In other words, the prism sheets 40 serve to set upright the progressing direction of the light from the surface of the light guide 42. The reflective sheet 44 reflects a light directing from the light guide 42 to the supporting frame 38 toward the light guide 42 again.

Furthermore, the LCD module shown in FIG. 2 includes a printed circuit board(PCB) 46 positioned under the reflective sheet 44 and between the supporting frames 38, and a flexible printed circuit (FPC) film 48 for coupling the PCB 46 with the liquid crystal cell matrix fabricated on the lower glass substrate 32. Drive integrated circuit chips 50 for driving the liquid crystal cell matrix are preferably mounted on the FPC film 48. The drive integrated circuit chips 50 drive the liquid crystal matrix fabricated on the lower glass substrate 32 in response to a signal from the PCB 46.

The NTPC according to the first embodiment of the present invention further includes a housing 52 for protecting the LCD module from an exterior impact and hostile external condition. The housing 52 is formed to substantially surround the bottom surface and the side surfaces of the LCD module. The housing 52 has a top bezel 52A defined at its upper end in such a manner to cover the edge of the lower glass substrate 32. The top bezel 52A engages the edges of the lower glass substrate 32 to hold the LCD module.

In the first embodiment, a buffing member 54 is positioned between the top bezel 52 and the lower glass substrate 32. The buffing member 54 extends into the side edge of the upper glass substrate 30. Such a buffing member 54 buffers an impact transferred to the side surface of the upper glass substrate 30 and to the edge of the lower glass substrate 32 when an external impact is applied to the housing 52 and the top bezel 52A. Preferably, the buffing member 54 is formed of any suitable material known to one of ordinary skill in the art to absorb impact, such as a protective tape or plastic. As described above, the top bezel 52A is positioned at the periphery or edge of the lower glass substrate 32 extending out from the periphery of the upper glass substrate 30. As a result, a thickness of the housing 52 can be reduced proportional to the thickness and arrangement of the upper glass substrate 30, the upper polarizing plate 34 and the buffing member 54. Furthermore, the thickness of the NTPC is reduced by at least the thickness of the upper glass substrate 30 and the upper polarizing plate 34.

Figure 3:
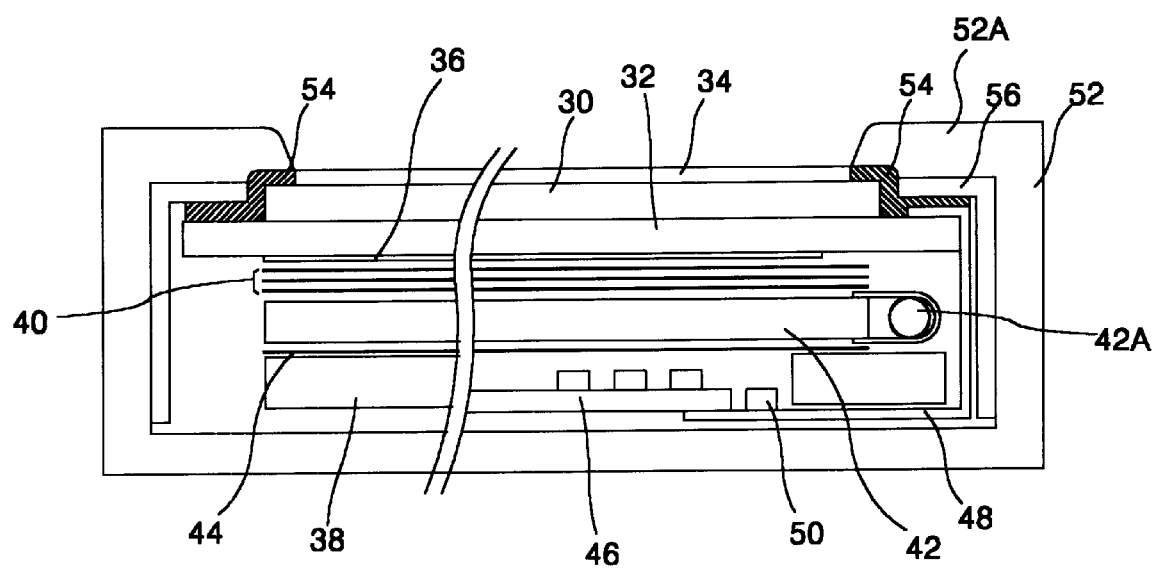
FIG. 3 is a sectional view showing the structure of a notebook personal computer according to a second embodiment of the present invention.

Referring to FIG. 3, there is shown a slim type NTPC having an LCD module according to a second embodiment of the present invention. The LCD module in FIG. 3 has the structure similar to the LCD module shown in FIG. 2. However, the NTPC of FIG. 3 has a top bezel 52A which extends into the periphery of the upper glass substrate 30 and has a metal frame 56 which is provided between the LCD module and the top bezel 52A. The top bezel 52A engages the edge or periphery of the upper glass substrate 30 which is attached or secured to a buffing member 54. The metal frame 56 engages the edge or periphery of the lower glass substrate 32 through the buffing member 54.

The buffing member 54 preferably extends to engage the edge of the lower glass substrate 32 as well as the edge of the upper glass substrate 30 and buffers an impact transferred to the side surface of the upper glass substrate 30 and to the edge of the lower glass substrate 32 when an external impact is applied to the housing 52 and the top bezel 52A. To this end, the buffing member 54 is formed of an impact absorbing member, such as a protective tape or plastic. As described above, the metal frame 56 is positioned from the edge of the lower glass substrate 32 exposed at the periphery of the upper glass substrate 30, so that the thickness of the housing 52 is proportional to the thickness of the upper glass substrate 30 and the upper polarizing plate 34. Furthermore, the NTPC becomes thin by the thickness of the upper glass substrate 30 and the upper polarizing plate 34.

Figure 4A:
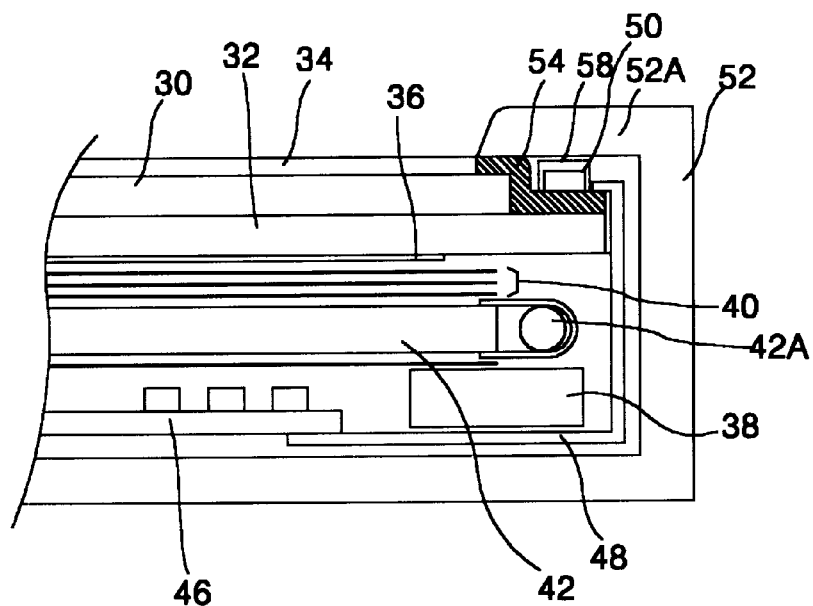
FIG. 4A is a partial sectional view showing the structure of a notebook personal computer according to a third embodiment of the present invention.

Referring to FIG. 4A, there is shown a slim type NTPC having an LCD module according to a third embodiment of the present invention. The NTPC of FIG. 4A is distinguished from the NTPC of FIG. 3 in that drive integrated circuits 50 are arranged near the edge or on the periphery of the lower glass substrate 32 and that a buffing dummy 58 is provided between the drive integrated circuits 50. Also, the NTPC of FIG. 4A may be constructed without the metal frame 56 shown in FIG. 3. An FPC film 48 couples the PCB 46 with the drive integrated circuits 50 positioned at the edge of the lower glass substrate 32.

In the third embodiment of the present invention, the top bezel 52A engages a buffing member 54 attached to the edge of the upper glass substrate 30 and the buffing dummy 58 arranged at the edge of the lower glass substrate 32.

Figure 4B:
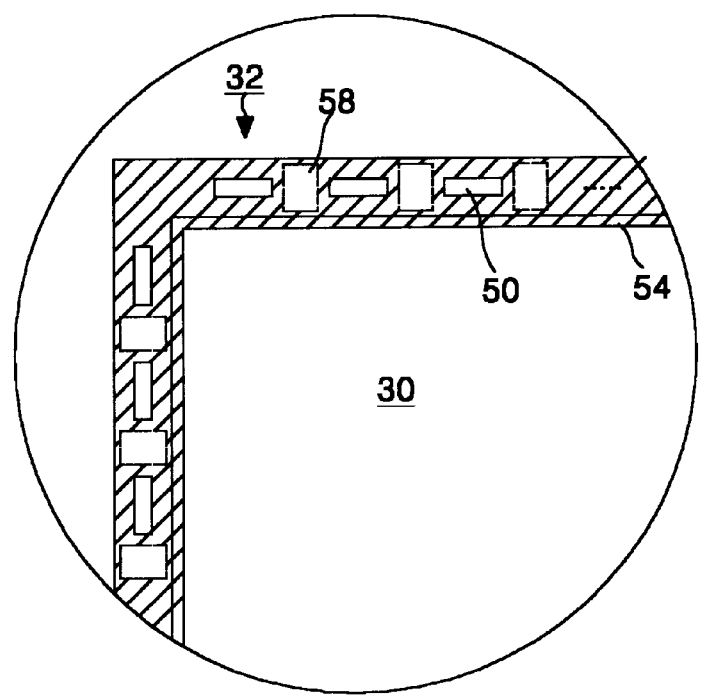
FIG. 4B is a plan view showing the upper glass substrate and the lower glass substrate in FIG. 4A.

In such a NTPC, the buffing member 54 is preferably secured to the edge of the lower glass substrate 32 as well as the edge of the upper glass substrate 30 as shown in FIG. 4B. The buffing member 54 acts as a buffer against an impact transferred to the edge of the upper glass substrate 30 when an external impact is applied to the housing 52 and the top bezel 52A. The buffing dummy 58 allows the drive integrated circuits 50 to be arranged alternately at the edge of the lower glass substrate 32. Also, the buffing dummy 58 is formed at a higher level than the drive integrated circuits 50 in such a manner that the top bezel 52A is not in contact with the drive integrated circuits 50. Such a buffing dummy 58 acts as a buffer against an impact transferred to the edge of the lower glass substrate 30 when an external impact is applied to the housing 52 and the top bezel 52A and, at the same time, protects the drive integrated circuits 50 from such an impact. As described above, the top bezel 52A is positioned at the edge of the upper glass substrate 30 so that the thickness of the housing 52 can be reduced at least by the thickness of the metal frame. Consequently, the thickness of the NTPC is reduced by approximately the thickness of the metal frame.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A flat panel display assembly, comprising:
    a first substrate;
    a second substrate disposed against the first substrate, the second substrate being smaller in width than the first substrate to expose at least one periphery of the first substrate;
    a buffer member adjacent the second substrate and the first substrate, the buffer member extending to and engaging a periphery of the second substrate, the periphery including at least a side edge of the second substrate and a portion of a surface of the second substrate adjacent to said side edge the buffer member abutting against the at least one periphery of the first substrate; and
    an extending part connected to a casing and defining a display area, the extending part pressed against the buffer member that extends to the periphery of the second substrate.

2. The flat panel display assembly of claim 1, wherein the extending part is disposed above and covers at least a portion of the periphery of the second substrate.

3. The flat panel display assembly of claim 1, wherein the extending part is disposed above and covers at least a portion of a periphery of the first substrate.

4. The flat panel display assembly of claim 1, wherein the extending part is a bezel that defines the display area of the second substrate.

5. The flat panel display assembly of claim 3, further comprising a frame connected to the casing and placed on the buffer member above the periphery of the second substrate.

6. A flat panel display assembly comprising:
    a first substrate;
    a second substrate disposed against the first substrate the second substrate being smaller in width than the first substrate to expose at least one periphery of the first substrate;
    a buffer member adjacent the second substrate and the first substrate, the buffer member extending to and engaging a periphery of the second substrate and abuts against the at least one periphery of the first substrate;
    an extending part connected to a casing and defining a display area, the extending part pressed against the buffer member that extends to the periphery of the second substrate,
    wherein the extending part is disposed above and covers at least a portion of a periphery of the first substrate; and
    driving circuits that drive the flat panel display assembly, wherein the driver is place in a gap formed between the extending part of the casing and the buffer member.

7. The flat panel display assembly of claim 6, further comprising at least one spacer placed in the gap, wherein the spacer has a thickness at least that of the driver circuits to absorb force applied on the extending member against the first substrate.

8. The flat panel display assembly of claim 1, wherein the buffer member is made of an impact absorption material.

9. The flat panel display assembly of claim 6, further including a plurality of spacers placed in the gap above the second substrate, wherein the spacers and driver circuits are alternatively arranged.

10. The flat panel display assembly of claim 6, wherein the extending part is disposed above and covers at least a portion of the periphery of the second substration.

11. The flat panel display assembly of claim 6, wherein the extending part is a bezel that defines the display are of the second substrate.

12. The flat panel display assembly of claim 6, wherein the buffer member is made of an impact absorption material.

13. A flat panel display assembly, comprising:
    a housing having a first extension portion extending from the housing in a first direction;
    a first substrate;
    a second substrate adjacent the first substrate, the second substrate being smaller in width than the first substrate to expose at least one periphery of the first substrate;
    a first buffer member adjacent a first side of the second substrate and the first substrate, the buffer member extending to and engaging a periphery of the second substrate, the buffer member abutting against the at least one periphery of the first substrate;
    wherein the first extension portion forces the first buffer member to press the second substrate onto the first substrate in a second direction.

14. The flat panel display assembly of claim 13, further comprising a second buffer member adjacent a second side of the second substrate and the housing includes a second extension portion, the second extension portion forcing the second buffer member to press the second substrate onto the first substrate.

15. The flat panel display assembly of claim 13, wherein the first and second extension portions are bezels that define a display area of the second substrate.

16. The flat panel display assembly of claim 13, wherein the second substrate is between the first and second buffer members.

17. The flat panel display assembly of claim 16, further comprising a polarizing plate between the first and second buffer members.

18. The flat panel display assembly of claim 16, wherein the housing extends continuously from the first extension portion to the second extension portion.

19. The flat panel display assembly of claim 16, wherein the first extension portion exerts a force on only a portion of the first buffer member.

20. The flat panel display assembly of claim 13, wherein the first buffer member has three sections including a first section extending in the first direction, a second section extending in the second direction, and a third section extending in the first direction.

21. The flat panel display assembly of claim 20, wherein the first section and the third section extend from the second section at different locations.

22. The flat panel display assembly of claim 20, wherein the first extension portion exerts a force onto the third section.

23. The flat panel display assembly of claim 20, wherein the first extension portion exerts a force at the first section of the first buffer member and the first extension portion is spaced from the third section of the first buffer member.

24. The flat panel display assembly of claim 23, further comprising a frame between the first extension portion and the third section of the first buffer member.

25. The flat panel display assembly of claim 23, wherein a gap is defined by the first extension portion and the third section of the first buffer member.

26. The flat panel display assembly of claim 25, further comprising an integrated circuit element in the gap.

27. The flat panel display assembly of claim 25, further comprising a spacer placed in the gap having a thickness at least that of the integrated circuit element.

28. The flat panel display assembly of claim 25, further comprising an integrated circuit element in one area of the gap and a spacer in another area of the gap.

29. The flat panel display assembly of claim 26, further comprising a plurality of integrated circuit elements and a plurality of spacers positioned alternately in the gap.

* * * * *